UNITED STATES PATENT OFFICE.

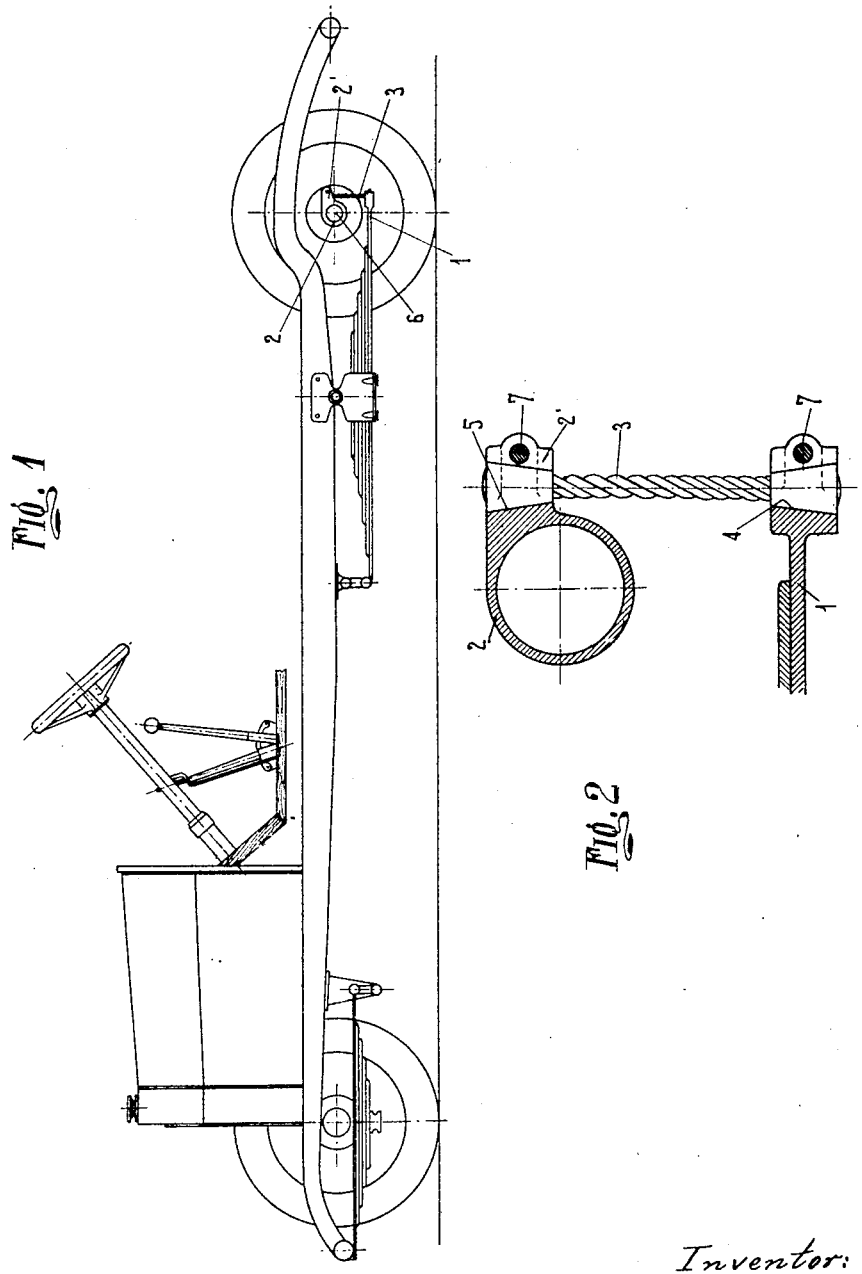

RODOLFO ZEPPEGNO, OF TURIN, ITALY, ASSIGNOR TO LANCIA & C., OF TURIN, ITALY, A COMPANY OF ITALY.

DEVICE FOR MOUNTING THE SPRINGS IN VEHICLES.

1,397,997. Specification of Letters Patent. Patented Nov. 22, 1921.

Application filed September 17, 1920. Serial No. 410,938.

*To all whom it may concern:*

Be it known that I, RODOLFO ZEPPEGNO, a subject of the King of Italy, and resident of Turin, Italy, have invented certain new and useful Improvements in Devices for Mounting the Springs in Vehicles, of which the following is a specification.

This invention relates to means for mounting the springs in vehicles, particularly in motor cars.

This invention has for its object a flexible connecting member which may be used instead of shackles and other rigid parts for connecting the springs with the vehicle frame when said connecting member is not required to prevent the spring from moving sidewise with regard to the frame.

On the annexed drawing is shown by way of example an embodiment of this invention and Figure 1 is the fragmentary side view of the frame of a motor car in which the rear ends of the rear springs are connected with the rear axle by means of a flexible member according to this invention; Fig. 2 is a detail view to an enlarged scale of said connecting member and coöperating parts.

As shown by said figures the member connecting the rear end of each spring 1 with the rear axle 2 consists of a piece of wire rope or cable 3 whose ends are engaged in seats 4 and 5 provided at the end of spring 1 and in an extension 2′ of a collar 2 clamped on the rear axle 6. Said seats may be provided with means as bolts 7 for clamping the rope heads.

The engagement of said rope 3 with said seats 4 and 5 may be obtained in any suitable manner, say by means of enlarged heads provided on said rope 3 by splicing its ends.

It is to be understood that the connecting member according to this invention may be used in connection with any arrangement of the springs with regard to the axle and frame, when said member is not required to prevent the side motion of the spring.

The arrangement according to this invention has the advantage of avoiding the friction in the shackle pivots as well as the wear which gives rise to play or lost motion in the shackle connections.

Further the arrangement according to this invention does not require means for lubricating the parts and allows the axle of moving freely with respect to the frame while providing a strong connection.

What I claim as my invention and desire to secure by United States Letters Patent is:—

1. The combination with a vehicle frame and an axle, of yieldable means interposed between said parts, comprising a spring connected at one end to one of said parts and a flexible cable connecting the other end of said spring to the other of said parts.

2. The combination with a vehicle frame and an axle, of yieldable means interposed between said parts, comprising a spring connected at one end to one of said parts and a wire rope connecting the other end of said spring to the other of said parts.

3. The combination with a vehicle frame and an axle, of yieldable means interposed between said parts, comprising a leaf spring connected at its forward end and intermediate its ends to the frame and a flexible cable connecting the rear end of said spring to said axle.

4. The combination with a vehicle frame and an axle, of yieldable means interposed between said parts, comprising a leaf spring connected to said frame, a collar connected to said axle, said spring and collar being provided each with a split socket, a wire rope connecting said spring and collar, said rope having heads at its opposite ends engaged in said sockets, and bolts for clamping said sockets to said heads.

5. The combination with a vehicle frame and an axle, of yieldable means interposed between said parts, comprising a leaf spring pivotally connected intermediate its ends to said frame, a shackle pivotally connecting the forward end of said spring to said frame, the rear end of said spring being provided with a split socket and located beneath said axle, a collar fixed to said axle and having a rearward extension provided with a split socket, a wire rope having heads at its opposite ends engaged in said sockets, and bolts for clamping said sockets to said heads.

Signed at Turin, Italy, August 31, 1920.

RODOLFO ZEPPEGNO.